(12) United States Patent
Morigasaki et al.

(10) Patent No.: US 9,440,885 B2
(45) Date of Patent: Sep. 13, 2016

(54) DIELECTRIC CERAMIC COMPOSITION AND ELECTRONIC COMPONENT

(71) Applicant: TDK CORPORATION, Minato-ku, Tokyo (JP)

(72) Inventors: Nobuto Morigasaki, Tokyo (JP); Takeru Yoshida, Tokyo (JP); Tomohisa Fukuoka, Tokyo (JP); Yuhta Matsunaga, Tokyo (JP); Kazuhiro Komatsu, Akita (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 14/663,160

(22) Filed: Mar. 19, 2015

(65) Prior Publication Data

US 2015/0274597 A1 Oct. 1, 2015

(30) Foreign Application Priority Data

Mar. 26, 2014 (JP) .................. 2014-064022

(51) Int. Cl.
| | |
|---|---|
| *C04B 35/00* | (2006.01) |
| *C04B 35/468* | (2006.01) |
| *C04B 35/638* | (2006.01) |
| *H01G 4/12* | (2006.01) |

(52) U.S. Cl.
CPC ......... *C04B 35/4682* (2013.01); *C04B 35/638* (2013.01); *H01G 4/1227* (2013.01); *C04B 2235/3206* (2013.01); *C04B 2235/3215* (2013.01); *C04B 2235/3224* (2013.01); *C04B 2235/3236* (2013.01); *C04B 2235/3239* (2013.01); *C04B 2235/3262* (2013.01); *C04B 2235/3418* (2013.01); *C04B 2235/5445* (2013.01); *C04B 2235/6562* (2013.01); *C04B 2235/6565* (2013.01); *C04B 2235/6567* (2013.01); *C04B 2235/6584* (2013.01); *C04B 2235/79* (2013.01); *C04B 2235/85* (2013.01)

(58) Field of Classification Search
CPC .............. C04B 35/462; C04B 35/468; C04B 35/4682; C04B 35/4686; C04B 35/47
USPC .................................................. 501/134–139
See application file for complete search history.

(56) References Cited

U.S. PATENT DOCUMENTS

| | | | |
|---|---|---|---|
| 5,995,360 A | 11/1999 | Hata et al. | |
| 7,323,428 B2 * | 1/2008 | Ito ....................... | H01G 4/1218 501/138 |

(Continued)

FOREIGN PATENT DOCUMENTS

| | | |
|---|---|---|
| JP | H10-223471 A | 8/1998 |
| JP | 2011-201761 A | 10/2011 |

*Primary Examiner* — Noah Wiese
(74) *Attorney, Agent, or Firm* — Arent Fox LLP

(57) ABSTRACT

A dielectric ceramic composition includes at least dielectric particles having a core-shell structure and segregation particles, a concentration of a rare earth compound in the segregation particle is twice or more than an average concentration of the rare earth compound in a shell part of the dielectric particle having the core-shell structure, an area occupied by the segregation particles is 0.1 to 1.1%, when a maximum particle size of the segregation particle is defined as $r_{bmax}$, a minimum particle size of the segregation particle is defined as $r_{bmin}$, and an average particle size of the dielectric particle having the core-shell structure is defined as $r_a$, a relation of $r_{bmax}/r_a \leq 2.00$ and $r_{bmin}/r_a \geq 0.25$ is satisfied, and the segregation particles substantially do not include Mg.

5 Claims, 5 Drawing Sheets

(56) References Cited

U.S. PATENT DOCUMENTS

| | | | | |
|---|---|---|---|---|
| 8,492,301 B2 * | 7/2013 | Takano | ............... | C04B 35/4682 361/321.4 |
| 2008/0236723 A1 * | 10/2008 | Nonaka | ............... | C04B 35/4682 156/89.14 |
| 2009/0059471 A1 * | 3/2009 | Fukuda | ................ | H01G 4/1227 361/321.4 |
| 2011/0216473 A1 * | 9/2011 | Takano | ............... | C04B 35/4682 361/321.5 |

* cited by examiner

Sample 3

Sample 16
(Comparative Example)

Sample 21

DIELECTRIC CERAMIC COMPOSITION AND ELECTRONIC COMPONENT

BACKGROUND OF THE INVENTION

1. Field of the Invention

The present invention relates to a dielectric ceramic composition and a ceramic electronic component having a dielectric layer composed of the dielectric ceramic composition.

2. Description of the Related Art

A multilayer ceramic capacitor that is one example of ceramic electronic components is widely used as electronic component having compact size, high efficiency and high reliability. A number of the multilayer ceramic capacitors are particularly used in electric and electronic apparatuses. Along with downsizing and performance improvement of the electric and electronic apparatuses, demands on downsizing, high performance, and improvement of reliability have been increasing toward the multilayer ceramic capacitor. Patent Document 1 and Patent Document 2 propose multilayer ceramic capacitors to meet such demands.

However, in recent years, the multilayer ceramic capacitor is further requested to be smaller and achieve higher capacity. Thus, dielectric layers are required to be thinner and more multilayered.

Therefore, demands on achieving sufficient reliability and favorable temperature characteristics are increasing for dielectric ceramic compositions even when dielectric layers are made thinner and more multilayered.

[Patent Document 1] JP Patent Application Laid Open No. H10-223471
[Patent Document 2] JP Patent Application Laid Open No. 2011-201761

SUMMARY OF THE INVENTION

The present invention has been made by considering such situation, and a purpose of the invention is to provide a dielectric ceramic composition and an electronic component satisfying good temperature characteristics and sufficient reliability even when electric field intensity is increased by making a dielectric layer thinner than before or when the number of the dielectric layers is increased.

In order to achieve the purpose, a dielectric ceramic composition according to the present invention comprises:

a main component having perovskite type crystal structure shown by a general formula $ABO_3$, where A is at least one selected from the group consisting of Ba, Ca and Sr, and B is at least one selected from the group consisting of Ti and Zr; and an additive including at least a rare earth compound, wherein the dielectric ceramic composition includes at least dielectric particles having a core-shell structure and segregation particles, a concentration of the rare earth compound in the segregation particle is twice or more than an average concentration of the rare earth compound in a shell part of the dielectric particle having the core-shell structure, an area occupied by the segregation particles is 0.1 to 1.1%, when a maximum particle size of the segregation particle is defined as $r_{bmax}$, a minimum particle size of the segregation particle is defined as $r_{bmin}$, and an average particle size of the dielectric particle having the core-shell structure is defined as $r_a$, a relation of $r_{bmax}/r_a \leq 2.00$ and $r_{bmin}/r_a \geq 0.25$ is satisfied, and the segregation particles substantially do not include Mg.

In the dielectric ceramic composition according to the present invention, preferably, the average particle size $r_a$ of the dielectric particle "a" is 0.16 to 0.26 μm.

Preferably, the dielectric ceramic composition according to the present invention comprises:

0.6 to 1.4 moles of an oxide of Ra in terms of $Ra_2O_3$, where Ra is at least one selected from the group consisting of Dy, Gd and Tb;

0.2 to 0.7 mole of an oxide of Rb in terms of $Rb_2O_3$, where Rb is at least one selected from the group consisting of Ho and Y; and 0.2 to 0.7 mole of an oxide of Rc in terms of $Rc_2O_3$, where Rc is at least one selected from the group consisting of Yb and Lu, as the rare earth compound, with respect to 100 moles of the main component.

Preferably, the dielectric ceramic composition according to the present invention comprises 0.6 to 1.6 moles of an oxide of Mg in terms of Mg, as the additive, with respect to 100 moles of the main component.

Preferably, the dielectric ceramic composition according to the present invention comprises 0.6 to less than 1.2 moles of a compound including Si in terms of Si, as the additive, with respect to 100 moles of the main component.

A ceramic electronic component according to the present invention has a dielectric layer composed of the dielectric ceramic composition, and an electrode layer.

DESCRIPTION OF THE PREFERRED EMBODIMENTS

Hereinafter, the present invention will be explained based on embodiments shown in the figures.

(Multilayer Ceramic Capacitor)

Figure 1:
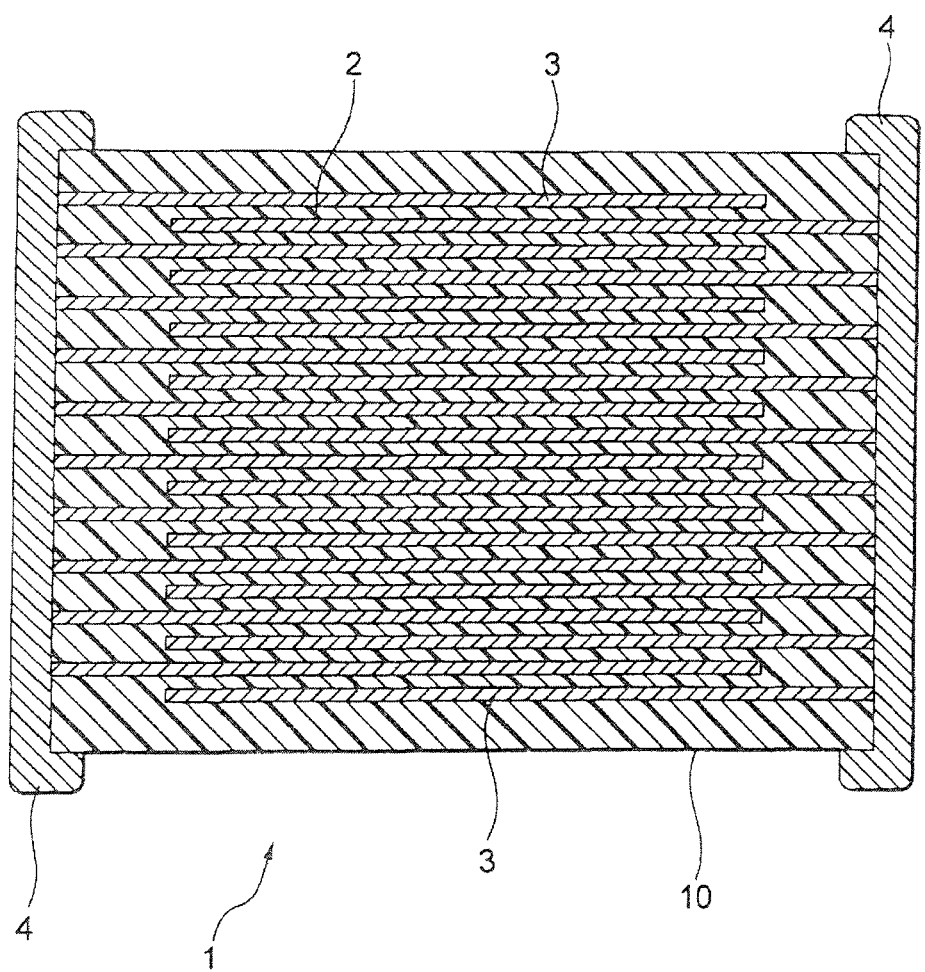
FIG. 1 is a cross sectional view of a multilayer ceramic capacitor according to one embodiment of the present invention.

As shown in FIG. 1, a multilayer ceramic capacitor 1 as one example of multilayer ceramic electronic components comprises a capacitor element body 10, where dielectric layers 2 and internal electrode layers 3 are alternately stacked. The internal electrode layers 3 are stacked so that each end face is alternately exposed to surfaces of the two opposed end portions of the capacitor element body 10. Also, the pair of external electrodes 4 is formed at both end portions of the capacitor element body 10, and connected with the exposed end faces of the alternately-stacked internal electrode layers 3 to form a capacitor circuit.

Although the capacitor element body 10 is not limited to a particular shape, it is normally formed as a rectangular parallelepiped shape as shown in FIG. 1. Also, the capacitor element body 10 is not limited to a particular dimension.

(Dielectric Layer)

The dielectric layer 2 is composed of a dielectric ceramic composition according to the present embodiment. The dielectric ceramic composition according to the present embodiment includes, as a main component, a compound shown by a general formula $ABO_3$ ("A" is at least one selected from Ba, Ca and Sr, and "B" is at least one selected from Ti and Zr). Also, the dielectric ceramic composition includes dielectric particles whose main component is $ABO_3$.

As the compound shown by the general formula $ABO_3$, a compound shown by $\{(Ba_{1-x-y}Ca_xSr_y)O\}_u(Ti_{1-z}Zr_z)_vO_3$ is exemplified. Note that, all of "u", "v", "x", "y" and "z" are within any range, but they are preferably within the following range.

In the above formula, "x" is preferably $0 \leq x \leq 0.1$, more preferably $0 \leq x \leq 0.05$. By setting "x" within the above range, temperature characteristic and specific permittivity of the dielectric layers composed of the dielectric ceramic composition according to the present invention can be controlled within a preferable range. When "x" is too large, specific permittivity of the dielectric layers tends to be too low. In the present embodiment, Ca may not be necessarily included. That is, "x" may be zero.

In the above formula, "y" is preferably $0 \leq y \leq 0.1$, more preferably $0 \leq y \leq 0.05$. By setting "y" within the above range, specific permittivity of the dielectric layers composed of the dielectric ceramic composition according to the present invention can be improved. When "y" is too large, temperature characteristic of the dielectric layers tends to be deteriorated. In the present embodiment, Sr may not be necessarily included. That is, "y" may be zero.

In the above formula, "z" is preferably $0 \leq z \leq 0.3$, more preferably $0 \leq z \leq 0.15$. By setting "z" within the above range, specific permittivity of the dielectric layers composed of the dielectric ceramic composition according to the present invention can be improved. When "z" is too large, temperature characteristic of the dielectric layers tends to be deteriorated. In the present embodiment, Zr may not be necessarily included. That is, "z" may be zero.

The main component of the dielectric ceramic composition according to the present embodiment is preferably barium titanate. That is, x=y=z=0 is preferable.

A ratio of Ba and Ti included in the dielectric ceramic composition (after firing) is preferably Ba/Ti=1.004 to 1.015, more preferably 1.007 to 1.012. By setting Ba/Ti within the above range, specific permittivity, reliability and temperature characteristic tend to be favorable.

In addition to the above main component, the dielectric ceramic composition according to the present embodiment includes at least a rare earth compound as the additive. As the rare earth compound, all of an oxide of Ra, an oxide of Rb and an oxide of Rc are preferably included. Here, Ra is at least one selected from a group of Dy, Gd and Tb. Rb is at least one selected from a group of Ho and Y. Rc is at least one selected from a group of Yb and Lu.

When a content of the oxide of Ra used as the main component with respect to 100 moles of $ABO_3$ is defined as "α", "α" is preferably 0.6 to 1.4 moles, more preferably 0.7 to 1.2 moles in terms of $Ra_2O_3$. By setting "α" within the above range, specific permittivity, temperature characteristic and high temperature accelerated lifetime tend to be favorable. It is particularly preferable to use Dy as the oxide of Ra.

When a content of the oxide of Rb used as the main component with respect to 100 moles of $ABO_3$ is defined as "β", "β" is preferably 0.2 to 0.7 mole, more preferably 0.2 to 0.6 mole in terms of $Rb_2O_3$. By setting "β" within the above range, specific permittivity, temperature characteristic and high temperature accelerated lifetime tend to be favorable. It is particularly preferable to include Ho as the oxide of Rb.

When a content of the oxide of Rc used as the main component with respect to 100 moles of $ABO_3$ is defined as "γ", "γ" is preferably 0.2 to 0.7 mole, more preferably 0.2 to 0.5 mole in terms of $Rc_2O_3$. By setting "γ" within the above range, specific permittivity, temperature characteristic and high temperature accelerated lifetime tend to be favorable. It is particularly preferable to include Yb as the oxide of Rc.

In the present embodiment, specific rare earth elements are divided into Ra, Rb and Rc based on values of effective ionic radius for six-fold coordination. In terms of effective ionic radius, when the difference between the rare earth elements and the Ba site atom is small, they tend to easily substitute (be solid-soluted into) A site, and when the difference between the rare earth elements and the Ba site atom is large, they tend to be hard to substitute (be solid-soluted into) A site.

In the present embodiment, the rare earth elements having a small ionic radius difference from Ba site atom correspond with Ra, and the rare earth elements having a large ionic radius difference from Ba correspond with Rc. Ra and Rc are different in the degree of solute into $ABO_3$. Ra tends to easily be solid-soluted into $ABO_3$ totally, while Rc tends to be solid-soluted into only periphery of $ABO_3$ and to form so-called core-shell structure. As a result, addition of Ra to the dielectric ceramic composition improves high temperature accelerated lifetime thereof, but temperature characteristic tends to be deteriorated. On the other hand, addition of Rc to the dielectric ceramic composition improves temperature characteristic thereof, but high temperature accelerated lifetime tends to be deteriorated. Rb has ionic radius difference from Ba site atom which is approximately between Ra and Rc.

In the present embodiment, the contents of the group of the three kinds of the rare earth elements of Ra, Rb and Rc are adjusted, which makes it easier to further improve high temperature accelerated lifetime while controlling the degree of solute rare earth elements of Ra, Rb and Rc and maintaining a preferable temperature characteristic.

In the present embodiment, it is preferred that the dielectric ceramic composition further include an oxide of Mg. With respect to 100 moles of $ABO_3$, the content of an oxide of Mg is preferably 0.6 to 1.2 moles, more preferably 0.7 to 1.1 moles in terms of MgO. By making the content of the oxide of Mg the upper limit or less of the above value range, Mg-including segregation particles mentioned below are hard to be present. On the other hand, by making the content of the oxide of Mg the lower limit or more of the above value range, abnormal grain growth of the dielectric particles is effectively prevented. Note that, when the dielectric particles abnormally grain grow and average particle size of the dielectric particles "a" having core-shell structure becomes too large, temperature characteristic of the dielectric layers tends to be deteriorated.

In the present embodiment, it is preferred that the dielectric ceramic composition further include a compound including Si. The compound including Si is preferably an oxide of Si. The oxide of Si mainly has a role as a sintering aid. With respect to 100 moles of $ABO_3$, a content of the oxide of Si is preferably 0.6 to less than 1.2 moles, more preferably 0.8 to 1.1 moles in terms of $SiO_2$. By making the content of the oxide of Si within the above value range, existence probability and maximum particle size $r_{bmax}$ of the segregation particle "b" mentioned below can be controlled. By controlling existence probability and maximum particle size $r_{bmax}$ of the segregation particle "b", high temperature accelerated lifetime, temperature characteristic and CR product are effectively improved.

The dielectric ceramic composition according to the present embodiment preferably further includes, as the additive, at least one or more oxides selected from a group of V, Mo and W and an oxide of Mn and/or Cr. By including the above components, characteristic can be further improved.

With respect to 100 moles of $ABO_3$, a content of at least one or more oxides selected from a group of V, Mo and W is preferably 0.03 to 0.1 mole and more preferably 0.05 to 0.09 mole in terms of V, Mo and W. By making the content of the above oxides within the above range, high temperature accelerated lifetime is improved. Further, it is particularly preferable to use V in the present embodiment.

With respect to 100 moles of $ABO_3$, a content of the oxide of Mn and/or Cr is preferably 0.10 to 0.20 mole in terms of Mn and/or Cr. By making the content of the oxide of Mn and/or Cr within the above range, high temperature accelerated lifetime and insulation resistance can be improved. In the present embodiment, compared with the oxide of Mn and the oxide of Cr, it is preferable to include the oxide of Mn because high temperature accelerated lifetime is more effectively improved.

Note that, in the present application, "oxides" include "composite oxides".

The dielectric layer of the present embodiment is not limited to a particular thickness, but it is preferably 1.0 to 10.0 μm.

Although stacked layers of the dielectric layer is not limited to a particular number, the number is preferably 20 or more, more preferably 50 or more, and still more preferably 100 or more. Although not particularly limited, an upper limit of the number of stacked layers is, for example, 2000 and so on.

Figure 2:
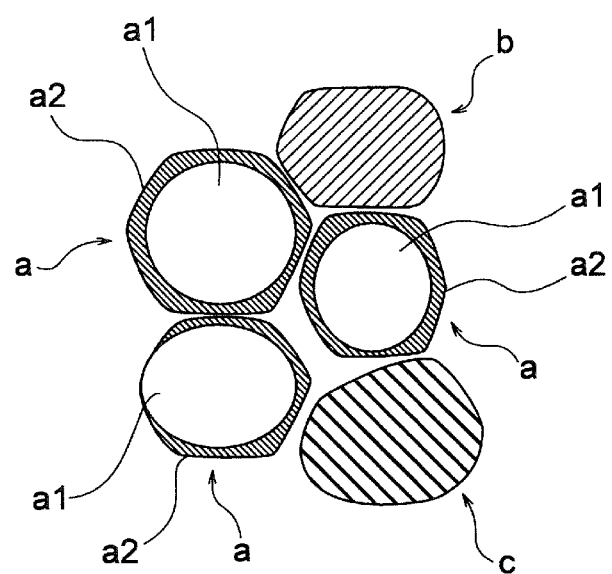
FIG. 2 is an enlarged cross sectional view of a main part of dielectric layers 2 shown in FIG. 1.

As shown in FIG. 2, in the dielectric ceramic composition according to the present embodiment, dielectric particles "a" and the segregation particle "b" are present as sub components in the $ABO_3$ particle which is the main component. The dielectric particles "a" have core-shell structure where at least rare earth oxide is solid-soluted. The segregation particle "b" includes rare earth oxide at a high concentration. Further, other dielectric particle "c", which corresponds with neither the dielectric particles "a" having the above core-shell structure nor the segregation particle "b", may be present.

(Dielectric Particles Having Core-Shell Structure and Segregation Particle)

For example, the dielectric particle "a" having core-shell structure is defined as a particle whose contrast is different between central part and peripheral part when reflected electron image of cut surface is photographed by Field Emission Scanning Electron Microscope (FE-SEM). Then, as shown in FIG. 2, the central part and the peripheral part of the dielectric particle "a" are defined as a core part a1 and a shell part a2, respectively.

The segregation particle "b" is a particle whose concentration of rare earth oxide is twice or more in the whole area thereof than average concentration of rare earth oxide of the shell part a2 of the dielectric particle "a" having core-shell structure. In the reflected electron image, the segregation particle "b" has contrast different from that of the core part a1 and the shell part a2.

(Measurement of Particle Size and Existing Area)

A method for measuring particle size and existing area of dielectric particles included in a dielectric layer is not limited, and they are measured by the following method, for example. First, obtained capacitor samples are cut at a surface vertical to internal electrodes, and pictures of reflected electron image of cut surface are taken by Field Emission Scanning Electron Microscope (FE-SEM). The number of pictures, observation area and magnification of the reflected electron image is not limited, but the reflected electron image is preferably photographed (multiple times) so that approximately 1000 or more of the dielectric particles "a" having core-shell structure are included in total. The magnification is preferably around 20000. The reflected electron image is processed by image processing software, and particle size and existing area are calculated by assuming that the shapes of the dielectric particles are sphere.

An average particle size $r_a$ of the dielectric particles "a" having core-shell structure is preferably calculated by averaging particle sizes of the dielectric particles "a" having approximately 1000 or more core-shell structures. A maximum particle size $r_{bmax}$ of the segregation particle "b" and a minimum particle size $r_{bmin}$ thereof are determined by measuring particle sizes of all of the segregation particles "b" present in the photographed reflected electron image.

(Presence of Mg in Segregation Particles "b")

A method for confirming the presence of Mg in the segregation particles "b" included in the dielectric layer is not limited, but it can be confirmed by the following method, for example. Mapping images of rare earth elements are formed by using STEM-EDX, and the segregation particles "b" are visually determined. Then, concentration of Mg is measured by point analysis of STEM-EDX against all of the segregation particles "b" determined visually, which confirms the presence of Mg in the segregation particles "b". Hereinafter, segregation particles substantially including Mg may be referred as Mg-including segregation particles.

(Preferable Embodiment of Dielectric Particles in the Present Embodiment)

In the present embodiment, in order to respond to the demand for making the dielectric layer thinner, the average particle size $r_a$ of the dielectric particles "a" having core-shell structures is preferably 0.16 to 0.26 μm, more preferably 0.17 to 0.25 μm. By making $r_a$ within the above range, specific permittivity, temperature characteristic and high temperature accelerated lifetime tend to be improved.

In the present embodiment, $r_{bmax}/r_a \leq 2.0$ is satisfied by the relation between the maximum particle size $r_{bmax}$ of the segregation particles "b" and the average particle size $r_a$ of the dielectric particles "a" having core-shell structures. Preferably, $r_{bmax}/r_a \leq 1.8$ is satisfied. When $r_{bmax}$ is too large for $r_a$, high temperature accelerated lifetime is decreased. This is because electric field concentration caused by resistance of the segregation particles "b" higher than that of the dielectric particles "a" occurs when DC voltage is applied.

In the present embodiment, $r_{bmin}/r_a \geq 0.25$ is satisfied by the relation between the minimum particle size $r_{bmin}$ of the segregation particles "b" and the average particle size $r_a$ of the dielectric particles "a" having core-shell structures. Preferably, $r_{bmin}/r_a \leq 0.40$ is satisfied. When $r_{bmin}$ is too small for $r_a$ or the segregation particle "b" is not present, high temperature accelerated lifetime is decreased. This is because additives are not adequately solid-soluted in the dielectric particles "a". When $r_{bmin}/r_a < 0.25$ is satisfied, Mg is easily included in the segregation particles "b" whose particle size is small.

The dielectric ceramic composition according to the present embodiment does not include the segregation particle "b" substantially including Mg. That is, in the present embodiment, the segregation particle "b" detected by observing the dielectric layer does not include Mg substantially. When the segregation particle "b" substantially including Mg is present, high temperature accelerated lifetime is extremely decreased.

In the present embodiment, when a total area occupied by the dielectric particles "a" having core-shell structures, the segregation particle "b" and other dielectric particle "c" is set as 100% at a cut surface (e.g., 3.0×4.0 μm) to be observed, an area of an existing region of the dielectric particles "a" having core-shell structures is preferably 60% or more, more preferably 70% or more. By enlarging the existing region of the dielectric particles "a" having core-shell structures, capacitance temperature characteristic is effectively improved.

In the present embodiment, when a total area occupied by the dielectric particles "a" having core-shell structures, the segregation particles "b" and other dielectric particles "c" is set as 100% at a cut surface (e.g., 3.0×4.0 μm) to be observed, an area of an existing region of the segregation particles "b" is 0.1 to 1.1%. Preferably, the total area is 0.3 to 0.5%. By making the existing region of the segregation particles "b" not substantially including Mg within the range, high temperature accelerated lifetime is remarkably improved.

It is preferred that components constituting the segregation particle "b" of the present embodiment be substantially made of R—Si—Ba—Ti—O composite oxide. A content rate of rare earth oxides $R_2O_3$ and $SiO_2$ in the composite oxide is preferably $R_2O_3:SiO_2$=0.3:0.7 to 0.7 to 0.3, more preferably approximately $R_2O_3:SiO_2$=0.5:0.5 by molar ratio.

The other dielectric particle "c" is not limited to a particular embodiment. As the embodiment of the other dielectric particle "c", for example, a low-concentration complete solid-soluted particle whose contrast is similar to that of the shell part of the dielectric particle "a" having core-shell structure, an $ABO_3$ particle where additives are not solid-soluted at all, and a dielectric particle where only additives other than the rare earth elements are solid-soluted are exemplified. Note that, existence probability of the other dielectric particle "c" may be 0%, that is, particles in the dielectric layer according to the present embodiment may be only the dielectric particles "a" having core-shell structures and the segregation particles "b" not substantially including Mg. The dielectric particles "a" having core-shell structures and the other dielectric particle "c" may include Mg or may not include Mg.

(Internal Electrode Layer)

A conductive material included in the internal electrode layer 3 is not limited. However, comparatively inexpensive base metal may be used because the material constituting the dielectric layer has resistance to reduction. When the base metal is used as the conductive material, Ni or Ni alloy is preferable. As for the Ni alloy, an alloy of Ni and one or more kind elements selected from Mn, Cr, Co and Al is preferable. Ni content in the alloy is preferably 95 wt % or more. Note that, 0.1 wt % or below or so of various miner components such as P may be included in the Ni or Ni alloy. A thickness of the internal electrode layer 3 may be suitably changed depending on a purpose of use, and is not limited. It is normally 0.1 to 3.0 μM and preferably 0.5 to 2.0 μm or so.

(External Electrode)

Although a conductive material included in external electrodes 4 is not limited, in the present embodiment, inexpensive Ni, Cu and their alloys may be used. A thickness of the external electrode 4 may be suitably determined depending on a purpose of use and the like, but it is normally preferably 10 to 50 μm or so.

(Producing Method for Multilayer Ceramic Capacitor 1)

As similar to a conventional multilayer ceramic capacitor, the multilayer ceramic capacitor 1 of the present embodiment is produced by producing green chips with normal printing method or sheet method using a paste, firing them, and firing external electrodes after printing or transferring them. Hereinafter, a producing method will be explained specifically.

Firstly, dielectric material (dielectric ceramic composition powder) is prepared and made into paste to prepare a paste (dielectric layer paste) for forming the dielectric layer.

(Dielectric Material)

As for the main component material of the dielectric material, firstly, a material of $ABO_3$ is prepared. It is preferable to use barium titanate shown by $Ba_uTi_vO_3$ as $ABO_3$.

The material of the $ABO_3$ may be one produced by various methods such as various liquid phase methods (for example, oxalate method, hydrothermal synthesis method, alkoxide method, sol-gel method and the like) as well as so-called solid phase method.

When barium titanate shown by $Ba_uTi_vO_3$ is used as the material of the $ABO_3$, u/v is preferably within a range of $1.000 \leq u/v \leq 1.005$. By setting u/v within the above range, it becomes easier to favorably control grain growth during firing. Then, temperature characteristic and high temperature accelerated lifetime are improved.

When barium titanate is used as the main component, an average particle size of the material of barium titanate is not limited, but it is preferably 0.13 to 0.23 μm and more preferably 0.16 to 0.22 μm. By setting the particle size of barium titanate used within the above range, it becomes easier to preferably control sintering and grain growth of the segregation particle "b". Then, reliability and temperature characteristic are improved.

As the material of the sub component, oxide of the above mentioned component, mixtures thereof, or composite oxide can be used. In addition, various compounds to be the above oxide or composite oxide by firing can be used. For example, a compound can be used by suitably selecting from such as carbonate, oxalate, nitrate, hydroxide or organic metal compounds and mixing it.

The producing method for the above dielectric ceramic composition powder is not limited, and as a method other than the above, barium titanate powder may be coated with a sub component, for example. The sub component for coating is not limited to a particular kind, either, but it is preferably oxide of R (Ra, Rb, Rc), oxide of Mg, and oxide of Si. A known method may be applied to the coating method. For example, barium titanate particle surface can be coated with each sub component by turning oxide of R (Ra, Rb, Rc), oxide of Mg, and oxide of Si into solution, mixing them with slurry in which barium titanate is dispersed, and applying heat treatment thereto.

A content of each compound in the dielectric material may be determined to obtain composition of the above-mentioned dielectric ceramic composition after firing. Note that, in the present embodiment, the present inventors confirm that the composition of the dielectric ceramic composition does not substantially change before and after firing except for a special case such as one that a part of each sub component mentioned above is vaporized during firing.

(Dielectric Layer Paste)

The dielectric layer paste may be an organic type paste obtained by kneading the dielectric material and an organic vehicle, or may be a water-based paste obtained by kneading the dielectric material and a water-based vehicle.

The organic vehicle is obtained by dissolving a binder in an organic solvent. The binder is not limited, and may be suitably selected from various binders for a normal organic vehicle such as ethyl cellulose, polyvinyl butyral and the like. Also, the organic solvent to be used is not limited, and may be suitably selected from various organic solvents such as terpineol, butyl carbitol, acetone, toluene and the like depending on the method to be used such as printing method or sheet method.

The water-based vehicle is obtained by dissolving a water soluble binder or dispersion agent etc. in water. The water soluble binder for the water-based vehicle is not limited, and may be suitably selected from various normal binders for a normal water-based vehicle such as polyvinyl alcohol, cellulose, water-soluble acrylic resin and the like.

(Internal Electrode Layer Paste)

An internal electrode layer paste is obtained by kneading the above-mentioned organic vehicle and conductive materials composed of the above-mentioned various conductive metals or alloys, or various oxides, organic metallic compound and resinate etc. to be the above-mentioned conductive materials after firing. Also, the internal electrode layer paste may include an inhibitor. The inhibitor is not limited, but preferably includes barium titanate.

(External Electrode Paste)

The external electrode paste may be prepared in the same way as the above-mentioned internal electrode layer paste.

The organic vehicle in each of the above mentioned paste is not limited to a particular content, and may be normal content. For example, a content of the binder may be 1 to 10 wt % or so, and a content of the solvent may be 10 to 50 wt % or so. Also, in each paste, additives selected from various dispersant agent, plasticizer, dielectric material, insulation material and the like may be included if needed. A total amount thereof is preferably 10 wt % or less.

(Printing and Stacking)

When using the printing method, the dielectric layer paste and the internal electrode layer paste are printed, stacked on a substrate such as PET and cut in a predetermined shape. Then, green chip is obtained by removing from the substrate.

When using the sheet method, a green sheet is formed by using the dielectric layer paste, and the internal electrode layer paste is printed thereon to form internal electrode patterns. Then, a green chip is obtained by stacking them.

(Binder Removal)

The binder removal conditions are not limited, but a temperature rising rate is preferably 5 to 300° C./hr; a holding temperature is preferably 180 to 800° C., and a temperature holding time is preferably 0.5 to 48 hrs. Also, binder removal atmosphere is preferably air or reducing atmosphere.

(Firing)

After the binder removal treatment, the green chip is fired. A temperature rising rate is preferably 100 to 2000° C./hr, more preferably 600 to 1000° C./hr. A holding temperature during firing is preferably 1300° C. or less, more preferably 1180 to 1290° C. A holding time during firing is preferably 0.2 to 20 hrs, more preferably 0.5 to 15 hrs. By setting the temperature rising rate and the holding time within the above range, it makes easier to control the size of the segregation particle "b" within the desired range while the sub component is sufficiently solid-soluted into the dielectric particles "a". Then, densification of the dielectric ceramic composition becomes easier while spheroidizing of the electrodes are prevented, and high temperature accelerated lifetime is improved. Note that, the temperature descending rate is not limited, but it is preferably 50 to 1000° C./hr.

Firing atmosphere is preferably reducing atmosphere. An atmosphere gas is not limited and, for example, a wet mixture gas of $N_2$ and $H_2$ may be used.

Also, an oxygen partial pressure during firing may be suitably determined depending on a kind of the conductive material in the internal electrode layer paste. When using base metal such as Ni or Ni alloy as the conductive material, the oxygen partial pressure in the firing atmosphere is preferably $10^{-14}$ to $10^{-10}$ MPa. By setting the oxygen partial pressure within the range, the conductive material of the internal electrode is easy to be sintered normally while the internal electrode layer is prevented from oxidizing.

(Annealing)

It is preferable to perform annealing to a capacitor element body after firing in the reducing atmosphere. The annealing is a treatment for reoxidation of the dielectric layer. The annealing enables insulation resistance (IR) of the dielectric layer to be improved remarkably and also enables high temperature accelerated lifetime (IR lifetime) to be improved.

The atmosphere during the annealing is not limited, but an oxygen partial pressure is preferably $10^{-9}$ to $10^{-5}$ MPa. By setting the oxygen partial pressure within the range, reoxidation of the dielectric layer becomes easier while the internal electrode layer is prevented from oxidizing.

A holding temperature during the annealing is not particularly limited, but it is preferably 1100° C. or less and more preferably 950 to 1090° C. By setting the holding temperature within the range, the dielectric layer is easy to be oxidized sufficiently. Also, oxidization of the internal electrode layer and reaction between the internal electrode layer and the dielectric layer are prevented, and temperature characteristic of the dielectric layer, insulation resistance (IR), high temperature accelerated lifetime (IR lifetime) and capacitance of a capacitor tend to be favorable.

As for other annealing conditions, a temperature holding time is preferably 0 to 20 hrs, more preferably 2 to 4 hrs. A temperature descending rate is preferably 50 to 1000° C./hr, more preferably 100 to 600° C./hr. Also, an atmosphere gas of the annealing is not limited and, for example, a wet $N_2$ gas is preferably used.

In the above-mentioned binder removal treatment, firing and annealing, for example, a wetter or so may be used to wet the $N_2$ gas, mixture gas and the like. In this case, a water temperature is preferably 5 to 75° C. or so.

The binder removal treatment, firing and annealing may be performed continuously or individually.

EXAMPLES

Example 1

First, $Ba_u Ti_v O_3$ powder (u/v=1.004) whose average particle size is 0.18 μm was prepared as raw powder of barium titanate, $Dy_2O_3$ powder was prepared as oxide material of Ra, $Ho_2O_3$ powder was prepared as oxide material of Rb, and $Yb_2O_3$ powder was prepared as oxide material of Rc.

Also, BaCO$_3$ powder was prepared as oxide material of Ba, MgO powder was prepared as oxide material of Mg, MnCO$_3$ powder was prepared as oxide material of Mn, V$_2$O$_5$ powder was prepared as oxide material of V, and SiO$_2$ powder was prepared as a sintering aid.

Next, the respective powder materials prepared in the above procedure were weighed. Dy$_2$O$_3$ powder, MgO powder and SiO$_2$ powder were weighed to have the amounts shown in Table 1 with respect to 100 moles of BaTiO$_3$. As for other powder materials, 0.4 mole of Ho$_2$O$_3$ powder, 0.2 mole of Yb$_2$O$_3$ powder, 0.5 mole of BaCO$_3$ powder, 0.2 mole of MnCO$_3$ powder, and 0.05 mole of V$_2$O$_5$ powder were weighed. The respective powder was wet mixed and pulverized by a ball mill for 20 hours followed by drying to obtain a dielectric material. Also, BaCO$_3$ and MnCO$_3$ would be respectively included as BaO and MgO in dielectric ceramic composition after firing.

Next, 100 parts by weight of the obtained dielectric material, 10 parts by weight of polyvinyl butyral resin, 5 parts by weight of dioctylphthalate (DOP) as a plasticizer, and 100 parts by weight of alcohol as solvent were mixed by a ball mill and made into a paste, so that a dielectric layer paste was obtained.

Apart from the above, 44.6 parts by weight of Ni particle, 52 parts by weight of terpineol, 3 parts by weight of ethylcellulose, and 0.4 part by weight of benzotriazole were kneaded by triple roll and made into a paste, so that an internal electrode layer paste was obtained.

Then, a green sheet was formed on a PET film by using the dielectric layer paste prepared in the above procedure so that thickness of the green sheet was 4.5 µm after drying. Next, after an electrode layer was printed thereon with a predetermined pattern by using the internal electrode layer paste, a sheet was removed from the PET film, so that a green sheet having the electrode layer was made. Next, a plurality of green sheets having the electrode layer was stacked and adhered by pressure to form a green stacking body. The green stacking body was cut in a predetermined size to obtain a green chip.

Next, the obtained green chip was subject to binder removal treatment, firing and annealing under the following conditions, so that a multilayer ceramic firing body was obtained.

The binder removal treatment was performed under the following conditions: temperature rising rate was 25° C./hr; holding temperature was 235° C.; holding time was 8 hrs; and atmosphere was in the air.

The firing was performed under the following conditions: temperature rising rate was 200° C./hr; holding temperature was 1260° C.; and holding time was 2 hrs. A temperature descending rate was 200° C./hr. Note that, an atmosphere gas was wet N$_2$+H$_2$ mixture gas so that an oxygen partial pressure was adjusted to $10^{-12}$ MPa.

The annealing was performed under the following conditions: temperature rising rate was 200° C./hr; holding temperature was 1050° C.; holding time was 3 hrs; temperature descending rate was 200° C./hr; and atmosphere gas was wet N$_2$ gas (oxygen partial pressure: $10^{-7}$ MPa).

Note that, a wetter was used for wetting the atmosphere gas at the firing and annealing.

Next, after barrel polishing an end face of the obtained multilayer ceramic firing body, Cu paste was applied as external electrodes and baking treatment was performed under reducing atmosphere, so that multilayer ceramic capacitor Samples 1 to 8 shown in Table. 1 were obtained (hereinafter, they may be merely represented as "capacitor samples"). The size of the obtained capacitor samples was 3.2 mm×1.6 mm×1.2 mm, the thickness between the adjacent dielectric layers was 3.0 µm, the thickness of the internal electrode layer was 1.0 µm. The number of the dielectric layers was 200.

As for the obtained each capacitor sample, the following measurement and confirmation were respectively performed by the method mentioned below. The measurement was carried out for specific permittivity; temperature characteristics, high temperature accelerated lifetime (HALT), average particle sizes $r_a$ of the dielectric particle "a" having core-shell structures, the maximum particle size $r_{bmax}$ of the segregation particles "b", and the minimum particle size $r_{bmin}$ of the segregation particles "b". The confirmation was carried out for existence of Mg in the segregation particle "b". The results are shown in Table 1.

(Specific Permittivity)

Specific permittivity of the capacitor samples was measured at a reference temperature of 25° C. with a digital LCR meter (4274A made by YHP) under conditions of a frequency of 1.0 kHz and an input signal level (measurement voltage) of 1.0 Vrms. Heat treatment was performed for the capacitor samples at 150° C. for 1 hr., and specific permittivity (no unit) was calculated from capacitance value, thickness of the dielectric body, and overlapping area of the internal electrodes in 24 hours. Higher specific permittivity was preferable, and in the present example, samples whose specific permittivity was 2200 or higher were considered to be favorable.

(Temperature Characteristic)

To the capacitor samples, a capacitance from −55 to 125° C. was measured under conditions of a frequency of 1.0 kHz and an input signal level (measurement voltage) of 1.0 Vrms, and a change rate of the capacitance was calculated based on the capacitance at 25° C. Then, the change rate was evaluated whether it satisfied the X7R characteristic, which is the temperature characteristic of EIA standard, or not.

(High Temperature Accelerated Lifetime)

To the capacitor samples, the lifetime was evaluated by measuring the insulation deterioration time of the capacitor samples while applying the DC voltage under the electric field of 25 V/µm at 175° C. In the present example, the lifetime was defined as the time from the beginning of the voltage application until the insulation resistance dropped by one digit. Also, in the present example, this high temperature accelerated lifetime evaluation was performed to 20 capacitor samples, and mean time to failure (MTTF), which was calculated by Weibull analysis thereto, was defined as an average lifetime of the samples. In the present example, a sample whose lifetime was 50 hours or longer was determined as favorable, and a sample whose lifetime was 100 hours or longer was determined as particularly favorable.

First, the obtained capacitor samples were cut at a surface vertical to the internal electrodes, and the cut surface was polished. Then, etching treatment was performed for the polished surface by ion milling, and thereafter, reflected electron images in an observation visual field of 3.0×4.0 µm were photographed by Field Emission Scanning Electron Microscope (FE-SEM). Five reflected electron images were photographed at positions different from each other on the cut surface. In terms of the photographs of the reflected electron images, a dielectric particle whose contrast is different between a central part and a periphery of the particle was considered to be one having core-shell structure.

Further, in terms of particles other than the dielectric particles having core-shell structure, a particle whose contrast was clearly different between the core part and the shell part (contrast which is different from that of the internal electrodes) in the reflected electron images was considered to be a segregation particle.

Also, observation by Scanning Transmission Electron Microscope (STEM) was performed, and the dielectric particles having core-shell structure and the segregation particles were distinguished. In this case, mapping of rare earth elements was performed by Scanning Transmission Electron Microscope Energy Dispersive X-ray (STEM-EDX) belonged to STEM, so that mapping images were made. Then, in the mapping images, contrasts were visually compared as similarly to the reflected electron images, and the dielectric particles having core-shell structures and the segregation particles were determined.

In terms of the dielectric particles having core-shell structures and the segregation particles, it was confirmed that results obtained by FE-SEM and results obtained by STEM-EDX correspond to each other preferably. In this case, concentration of the rare earth compounds in the segregation particles was twice or more than an average concentration of the rare earth compounds at the shell part of the dielectric particles having core-shell structures.

Note that, in addition to the dielectric particles having core-shell structures and the segregation particles, there were also samples including other dielectric particles. In terms of the other dielectric particles, there were also particles in which rare earth compounds were completely solid-soluted therein.

(Average Particle Size $r_a$ of Dielectric Particles Having Core-Shell Structures)

In the photographs of the reflected electron images, shapes of the dielectric particles having core-shell structures were assumed as sphere by image processing software, and an average particle size $r_a$ of approximately 1000 dielectric particles having core-shell structures were calculated.

(Segregation Particle Existing Rate, Maximum Particle Size $r_{bmax}$ and Minimum Particle Size $r_{bmin}$)

First, shapes of particles were assumed as sphere by image processing software, and in the five photographs of the reflected electron image, an area of segregation particles, an area of dielectric particles having core-shell structure and an area of other dielectric particles were respectively calculated. Then, a segregation particle existing rate was calculated. Also, the maximum particle size $r_{bmax}$ and the minimum particle size $r_{bmin}$ were calculated by assuming that, in terms of multiple segregation particles in the five photographs of the reflected electron image, the segregation particle having the largest particle size and the segregation particle having the smallest particle size have shapes of sphere by image processing software.

(Presence of Mg-Including Segregation Particles)

The polished surface was observed by STEM. This observation was performed in an observation visual field of 1.0×1.0 μm. Then, mapping of each additive element was performed by Scanning Transmission Electron Microscope Energy Dispersive X-ray (STEM-EDX) belonged to STEM.

Places where segregation particles exist were visually confirmed by the mapping of rare earth elements. Then, point analysis was performed by STEM-EDX for all segregation particles in the observation visual field, and presence of Mg-including segregation particles was confirmed. Note that, when a total of all elements included in the segregation particles was considered as 100 atom %, a segregation particle whose Mg concentration was 0.2 atom % or more was defined as the Mg-including segregation particle.

TABLE 1

| Sample No. | Composition [mol %] | | | | | ra [μm] | rbmax/ra | rbmin/ra | FE-SEM observation Segregation particle existing rate [%] | Mg-including segregation Particle | Characteristics Specific permittivity | X7R characteristic | MTTF[h] |
|---|---|---|---|---|---|---|---|---|---|---|---|---|---|
| | Ra2O3 | Rb2O3 | Rc2O3 | MgO | SiO2 | | | | | | | | |
| ✗1 | 0.5 | 0.4 | 0.2 | 0.8 | 0.8 | 0.19 | — | — | 0 | none | 2138 | ○ | 10 |
| 2 | 0.6 | 0.4 | 0.2 | 0.9 | 0.9 | 0.19 | 1.30 | 0.93 | 0.1 | none | 2668 | ○ | 60 |
| 3 | 0.8 | 0.4 | 0.2 | 0.9 | 0.9 | 0.20 | 1.29 | 0.93 | 0.2 | none | 2727 | ○ | 85 |
| 4 | 1.1 | 0.4 | 0.2 | 1 | 1 | 0.19 | 1.72 | 0.96 | 0.5 | none | 2517 | ○ | 83 |
| 5 | 1.2 | 0.4 | 0.2 | 1.1 | 1.1 | 0.20 | 1.84 | 0.88 | 0.7 | none | 2307 | ○ | 100 |
| 6 | 1.3 | 0.4 | 0.2 | 1.1 | 1.1 | 0.20 | 1.75 | 0.60 | 1.1 | none | 2215 | ○ | 65 |
| ✗7 | 1.5 | 0.4 | 0.2 | 1.2 | 1.2 | 0.20 | 2.30 | 0.39 | 1.4 | none | 2104 | ○ | 16 |
| ✗8 | 1.7 | 0.4 | 0.2 | 1.3 | 1.3 | 0.21 | 2.55 | 0.23 | 2.0 | none | 2052 | ○ | 23 |

Samples with "✗" are Comparative Examples.

According to Table 1, when $r_{bmax}/r_a$, $r_{bmin}/r_a$ and segregation particle existing rate were within a range of the present invention and Mg-including segregation particles were not present (Samples 2 to 6), all of specific permittivity, capacitance temperature characteristic and high temperature accelerated lifetime were preferable.

Example 2

Except that average particle size of barium titanate ($Ba_uTi_vO_3$ (u/v=1.004)) to be main material was set to be values shown in Table 2, as similar to Sample 3 of Example 1, multilayer ceramic capacitor samples of Samples 9 to 13 were prepared and characteristic evaluation similar to that of Example 1 was performed. The results are shown in Table 2.

TABLE 2

| Sample No. | Material Average particle size of BaTiO3 material | ra [μm] | rbmax/ra | rbmin/ra | FE-SEM observation Segregation particle existing rate [%] | Mg-including segregation particle | Specific permittivity | X7R characteristic | MTTF[h] |
|---|---|---|---|---|---|---|---|---|---|
| X9 | 0.12 | 0.14 | 2.37 | 1.50 | 0.5 | none | 2121 | X | 78 |
| 10 | 0.15 | 0.16 | 1.68 | 0.97 | 0.3 | none | 2215 | ○ | 86 |
| 3 | 0.18 | 0.20 | 1.29 | 0.93 | 0.2 | none | 2727 | ○ | 85 |
| 11 | 0.20 | 0.22 | 1.27 | 0.57 | 0.3 | none | 2834 | ○ | 98 |
| 12 | 0.25 | 0.26 | 1.84 | 0.53 | 0.3 | none | 2898 | ○ | 65 |
| X13 | 0.30 | 0.31 | 1.68 | 0.20 | 0.6 | exist | 3021 | ○ | 7 |

Samples with "X" are Comparative Examples.

According to Table 2, when $r_{bmax}/r_a$, $r_{bmin}/r_a$ and segregation particle existing rate were within a range of the present invention and Mg-including segregation particles were not present (Samples 10 to 12), all of specific permittivity, capacitance temperature characteristic and high temperature accelerated lifetime were preferable.

Example 3

Except for the firing conditions, multilayer ceramic capacitor samples of Samples 14 to 27 were prepared as similar to Sample 3 of Example 1 and characteristic evaluation was performed in the same way as Example 1. The firing conditions of Example 3 were changed as follows: temperature rising rate was 200 to 2000° C./hr; holding temperature was 1180 to 1300° C.; holding time was 0.5 to 20 hrs; and temperature descending rate was 600 to 800° C./hr. Also, an atmosphere gas was wet $N_2+H_2$ mixture gas, and an oxygen partial pressure was $10^{-12}$ MPa. The results are shown in Table 3.

According to Table 3, when $r_{bmax}/r_a$, $r_{bmin}/r_a$ and segregation particle existing rate were within a range of the present invention and Mg-including segregation particles were not present (Samples 17, 18, 20, 21, 23, 25, 26 and 27), all of specific permittivity, capacitance temperature characteristic and high temperature accelerated lifetime were favorable.

It was confirmed that compared with the case that Mg-including segregation particles were present (Samples 14, 16, 19, 22 and 28), high temperature accelerated lifetime was favorable in the case that Mg-including segregation particles were not present.

Example 4

Except for added amount of $Dy_2O_3$ powder, $Ho_2O_3$ powder, $Yb_2O_3$ powder, MgO powder, and $SiO_2$ powder, multilayer ceramic capacitor samples of Samples 31 to 53 were prepared as similar to Samples 2 and 3 of Example 1, and characteristic evaluation was performed in the same way as Example 1. The results are shown in Table 4.

TABLE 3

| Sample No. | Composition [mol %] Ra2O3 | Rb2O3 | Rc2O3 | MgO | SiO2 | ra [μm] | rbmax/ra | rbmin/ra | FE-SEM observation Segregation particle existing rate [%] | Mg-including segregation particle | Specific permittivity | X7R characteristic | MTTF[h] |
|---|---|---|---|---|---|---|---|---|---|---|---|---|---|
| X14 | 0.8 | 0.4 | 0.2 | 0.9 | 0.9 | 0.19 | 1.21 | 0.14 | 0.3 | exist | 2165 | ○ | 3 |
| 3 | 0.8 | 0.4 | 0.2 | 0.9 | 0.9 | 0.20 | 1.29 | 0.93 | 0.2 | none | 2727 | ○ | 85 |
| X15 | 0.8 | 0.4 | 0.2 | 0.9 | 0.9 | 0.29 | 2.17 | 0.78 | 0.7 | none | 2876 | X | 76 |
| X16 | 0.8 | 0.4 | 0.2 | 0.9 | 0.9 | 0.19 | 1.13 | 0.19 | 0.3 | exist | 2528 | ○ | 6 |
| 17 | 0.8 | 0.4 | 0.2 | 0.9 | 0.9 | 0.19 | 1.24 | 0.86 | 0.2 | none | 2483 | ○ | 67 |
| 18 | 0.8 | 0.4 | 0.2 | 0.9 | 0.9 | 0.22 | 1.46 | 0.96 | 0.3 | none | 2459 | ○ | 79 |
| X19 | 0.8 | 0.4 | 0.2 | 0.9 | 0.9 | 0.19 | 1.32 | 0.21 | 0.3 | exist | 2234 | ○ | 12 |
| 20 | 0.8 | 0.4 | 0.2 | 0.9 | 0.9 | 0.20 | 1.81 | 0.50 | 0.2 | none | 2478 | ○ | 56 |
| 21 | 0.8 | 0.4 | 0.2 | 0.9 | 0.9 | 0.22 | 1.65 | 1.28 | 0.4 | none | 2856 | ○ | 156 |
| X22 | 0.8 | 0.4 | 0.2 | 0.9 | 0.9 | 0.19 | 1.20 | 0.22 | 0.5 | exist | 2432 | ○ | 23 |
| 23 | 0.8 | 0.4 | 0.2 | 0.9 | 0.9 | 0.23 | 1.50 | 1.27 | 0.5 | none | 2872 | ○ | 134 |
| X24 | 0.8 | 0.4 | 0.2 | 0.9 | 0.9 | 0.28 | 2.81 | 1.44 | 1.2 | none | 3078 | X | 37 |
| 25 | 0.8 | 0.4 | 0.2 | 0.9 | 0.9 | 0.24 | 1.63 | 1.03 | 0.7 | none | 2874 | ○ | 143 |
| 26 | 0.8 | 0.4 | 0.2 | 0.9 | 0.9 | 0.23 | 1.30 | 0.82 | 0.3 | none | 2833 | ○ | 136 |
| 27 | 0.8 | 0.4 | 0.2 | 0.9 | 0.9 | 0.22 | 1.38 | 0.71 | 0.3 | none | 2901 | ○ | 105 |
| X28 | 0.8 | 0.4 | 0.2 | 0.9 | 0.9 | 0.19 | 1.20 | 0.34 | 0.4 | exist | 2498 | ○ | 44 |

Samples with "X" are Comparative Examples.

TABLE 4

| Sample No. | Composition [mol %] | | | | | $r_a$ [μm] | $r_{bmax}/r_a$ | $r_{bmin}/r_a$ | Segregation particle existing rate [%] | Mg-including segregation particle | Specific permittivity | X7R characteristic | MTTF[h] |
|---|---|---|---|---|---|---|---|---|---|---|---|---|---|
| | Ra2O3 | Rb2O3 | Rc2O3 | MgO | SiO2 | | | | | | | | |
| ✗31 | 0.4 | 0.4 | 0.2 | 0.9 | 0.9 | 0.20 | — | — | 0 | none | 2098 | ○ | 8 |
| 2 | 0.6 | 0.4 | 0.2 | 0.9 | 0.9 | 0.19 | 1.30 | 0.93 | 0.1 | none | 2668 | ○ | 60 |
| 3 | 0.8 | 0.4 | 0.2 | 0.9 | 0.9 | 0.20 | 1.29 | 0.93 | 0.2 | none | 2727 | ○ | 85 |
| 32 | 1.4 | 0.4 | 0.2 | 0.9 | 0.9 | 0.21 | 1.92 | 0.53 | 0.5 | none | 2532 | ○ | 68 |
| ✗33 | 1.6 | 0.4 | 0.2 | 0.9 | 0.9 | 0.22 | 2.12 | 0.39 | 1.5 | none | 2124 | ○ | 35 |
| ✗34 | 1.0 | 0.1 | 0.3 | 1.0 | 1.0 | 0.24 | 2.06 | 0.78 | 1.2 | none | 2676 | X | 75 |
| 35 | 1.0 | 0.2 | 0.3 | 1.0 | 1.0 | 0.23 | 2.00 | 0.81 | 0.7 | none | 2612 | ○ | 81 |
| 36 | 1.0 | 0.4 | 0.3 | 1.0 | 1.0 | 0.20 | 1.36 | 0.90 | 0.3 | none | 2654 | ○ | 91 |
| 37 | 1.0 | 0.7 | 0.3 | 1.0 | 1.0 | 0.19 | 1.34 | 0.41 | 0.3 | none | 2521 | ○ | 78 |
| ✗38 | 1.0 | 0.8 | 0.3 | 1.0 | 1.0 | 0.19 | 1.07 | 0.23 | 0.3 | none | 2275 | ○ | 48 |
| ✗39 | 0.9 | 0.4 | 0.1 | 1.0 | 1.0 | 0.26 | 2.16 | 0.82 | 1.3 | none | 2761 | X | 77 |
| 40 | 0.9 | 0.4 | 0.2 | 1.0 | 1.0 | 0.25 | 1.96 | 0.90 | 0.7 | none | 2651 | ○ | 89 |
| 41 | 0.9 | 0.4 | 0.4 | 1.0 | 1.0 | 0.20 | 1.37 | 0.93 | 0.2 | none | 2656 | ○ | 83 |
| 42 | 0.9 | 0.4 | 0.7 | 1.0 | 1.0 | 0.19 | 1.17 | 0.46 | 0.2 | none | 2409 | ○ | 51 |
| ✗43 | 0.9 | 0.4 | 0.8 | 1.0 | 1.0 | 0.19 | 1.06 | 0.18 | 0.1 | exist | 2175 | ○ | 4 |
| ✗44 | 0.9 | 0.4 | 0.4 | 0.5 | 1.0 | 0.25 | 2.14 | 1.06 | 1.4 | none | 2875 | X | 56 |
| 45 | 0.9 | 0.4 | 0.4 | 0.6 | 1.0 | 0.24 | 1.96 | 0.93 | 0.6 | none | 2732 | ○ | 68 |
| 46 | 0.9 | 0.4 | 0.4 | 1.1 | 1.0 | 0.20 | 1.40 | 0.73 | 0.3 | none | 2501 | ○ | 102 |
| 47 | 0.9 | 0.4 | 0.4 | 1.6 | 1.0 | 0.19 | 1.05 | 0.58 | 0.4 | none | 2419 | ○ | 53 |
| ✗48 | 0.9 | 0.4 | 0.4 | 1.7 | 1.0 | 0.19 | 1.06 | 0.41 | 0.4 | exist | 2177 | ○ | 3 |
| ✗49 | 0.9 | 0.4 | 0.4 | 1.0 | 0.5 | 0.19 | 1.19 | 0.24 | 0.5 | exist | 2021 | ○ | 14 |
| 50 | 0.9 | 0.4 | 0.4 | 1.0 | 0.6 | 0.19 | 1.20 | 0.31 | 0.4 | none | 2419 | ○ | 65 |
| 51 | 0.9 | 0.4 | 0.4 | 1.0 | 0.8 | 0.20 | 1.22 | 0.47 | 0.6 | none | 2578 | ○ | 88 |
| 52 | 0.9 | 0.4 | 0.4 | 1.0 | 1.1 | 0.21 | 1.76 | 0.80 | 0.7 | none | 2644 | ○ | 102 |
| ✗53 | 0.9 | 0.4 | 0.4 | 1.0 | 1.2 | 0.22 | 2.04 | 0.70 | 0.6 | none | 2721 | X | 121 |

Samples with "✗" are Comparative Examples.

According to Table 4, when $r_{bmax}/r_a$, $r_{bmin}/r_a$ and segregation particle existing rate were within a range of the present invention and Mg-including segregation particles were not present (Samples 32, 35 to 37, 40 to 42, 45 to 47 and 50 to 52), all of specific permittivity, capacitance temperature characteristic and high temperature accelerated lifetime were favorable.

Example 5

Except for kinds of Ra, Rb and Rc, multilayer ceramic capacitor samples of Samples 54 to 59 were prepared as similar to Sample 3 of Example 1 and characteristic evaluation was performed in the same way as Example 1. The results are shown in Table 5.

According to Table 5, when $r_{bmax}/r_a$, $r_{bmin}/r_a$ and segregation particle existing rate were within a range of the present invention and Mg-including segregation particles were not present, all of specific permittivity, capacitance temperature characteristic and high temperature accelerated lifetime were favorable. Also, it was confirmed that it was the most preferable to use Dy, Ho and Yb as Ra, Rb and Rc to obtain a favorable specific permittivity.

Example 6

Except that the firing conditions were the same as those of Sample 21 of Example 3, multilayer ceramic capacitor samples were prepared under the same conditions as Sample 33 (comparative example) of Example 5 to obtain Sample 60. Then, characteristic evaluation was performed under the same conditions as Example 5. The results are shown in Table 6.

TABLE 5

| Sample No. | Kind of rare earth elements | | | $r_a$ [μm] | $r_{bmax}/r_a$ | $r_{bmin}/r_a$ | Segregation particle existing rate [%] | Mg-including segregation particle | Specific permittivity | X7R characteristic | MTTF[h] |
|---|---|---|---|---|---|---|---|---|---|---|---|
| | Ra | Rb | Rc | | | | | | | | |
| 3 | Dy | Ho | Yb | 0.20 | 1.29 | 0.93 | 0.2 | none | 2727 | ○ | 85 |
| 54 | Gd | Ho | Yb | 0.23 | 1.72 | 0.79 | 0.5 | none | 2678 | ○ | 78 |
| 55 | Tb | Ho | Yb | 0.23 | 1.91 | 0.88 | 0.6 | none | 2549 | ○ | 66 |
| 56 | Dy | Y | Yb | 0.20 | 0.98 | 0.61 | 0.3 | none | 2443 | ○ | 81 |
| 57 | Dy | Y | Lu | 0.23 | 1.17 | 0.40 | 0.2 | none | 2368 | ○ | 55 |
| 58 | Tb | Y | Yb | 0.23 | 1.49 | 0.86 | 0.4 | none | 2410 | ○ | 92 |
| 59 | Gd | Y | Lu | 0.23 | 1.82 | 0.95 | 0.5 | none | 2567 | ○ | 65 |

TABLE 6

| | Composition [mol %] | | | | | ra | rbmax/ | rbmin/ | FE-SEM observation Segregation particle existing | Mg-including segregation | Characteristics Specific | X7R | |
|---|---|---|---|---|---|---|---|---|---|---|---|---|---|
| Sample No. | Ra2O3 | Rb2O3 | Rc2O3 | MgO | SiO2 | [µm] | ra | ra | rate [%] | particle | permittivity | characteristic | MTTF[h] |
| X33 | 1.6 | 0.4 | 0.2 | 0.9 | 0.9 | 0.22 | 2.12 | 0.39 | 1.5 | none | 2124 | ○ | 35 |
| 60 | 1.6 | 0.4 | 0.2 | 0.9 | 0.9 | 0.23 | 1.90 | 0.38 | 1.0 | none | 2289 | ○ | 72 |

Samples with "X" are Comparative Examples.

According to Table 6, when $r_{bmax}/r_a$, $r_{bmin}/r_a$ and segregation particle existing rate were within a range of the present invention and Mg-including segregation particles were not present (Sample 60), all of specific permittivity, capacitance temperature characteristic and high temperature accelerated lifetime were favorable.

Figure 3A:
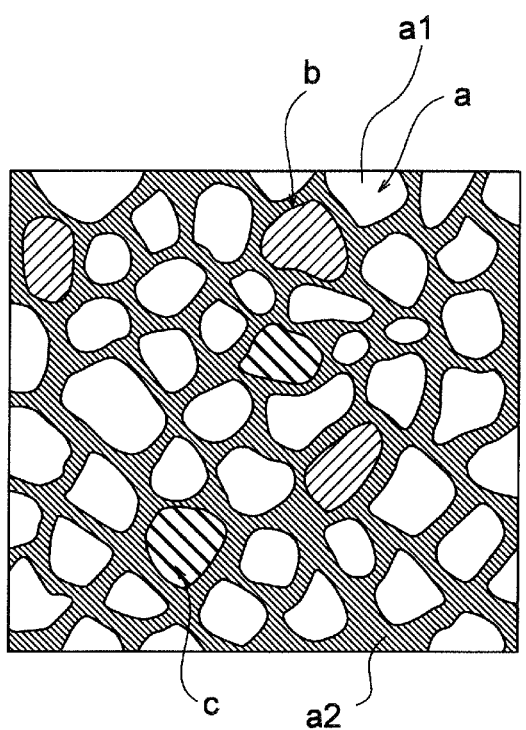
FIG. 3A is a schematic view of a cut surface of a dielectric ceramic composition according to Sample 3.
Figure 3B:
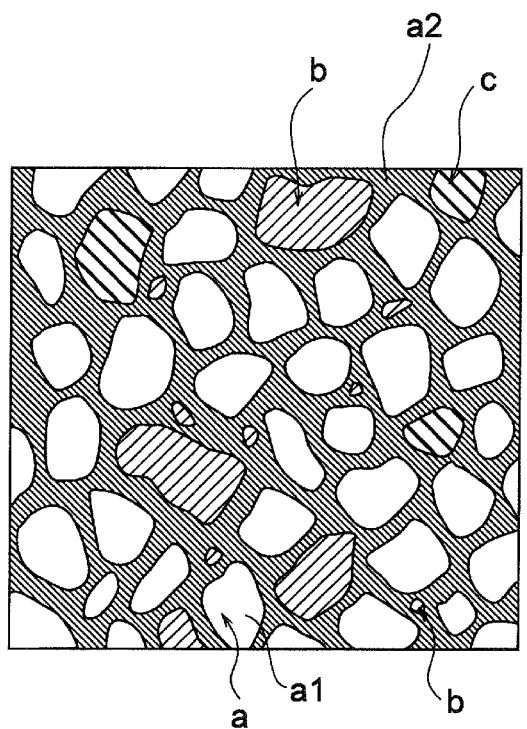
FIG. 3B is a schematic view of a cut surface of a dielectric ceramic composition according to Sample 16.
Figure 3C:
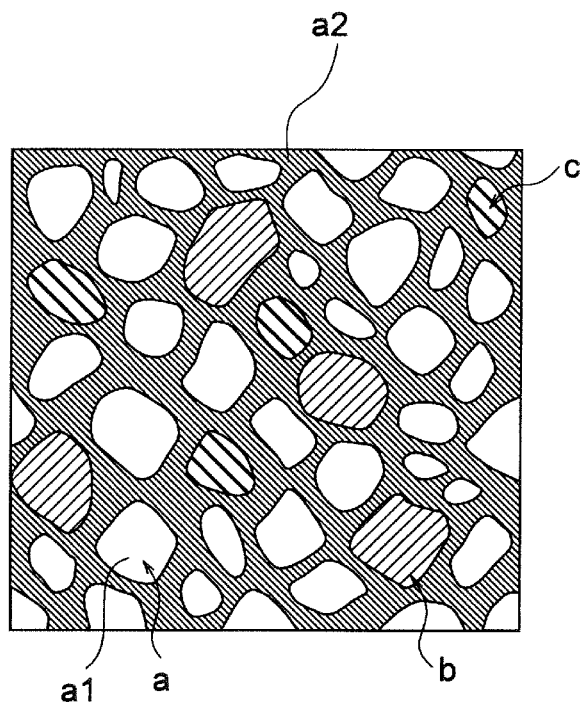
FIG. 3C is a schematic view of a cut surface of a dielectric ceramic composition according to Sample 21.

FIG. 3A, FIG. 3B and FIG. 3C show schematic views of the dielectric ceramic compositions regarding Sample 3 (Example), Sample 16 (Comparative Example) and Sample 21 (Example). Note that, in order to prioritize easy understanding, the number of segregation particles "b" and other dielectric particles "c" is described more than the number actually included.

FIG. 3B showing Sample 16 is compared with FIG. 3A showing Sample 3 and FIG. 3C showing Sample 21. In FIG. 3A, FIG. 3B and FIG. 3C, the dielectric particles "a" having core-shell structure, the segregation particles "b" and the other dielectric particles "c" are commonly observed. However, FIG. 3B is different from FIG. 3A and FIG. 3C in that minor segregation particles "b" are observed in FIG. 3B, but they are not observed in FIG. 3A and FIG. 3C. When the minor segregation particles "b" are present, $r_{bmin}/r_a$ becomes small. The minor segregation particles "b" are mostly Mg-including segregation particles. In terms of Sample 16 (FIG. 3B), Mg-including segregation particles are present in the minor segregation particles "b".

Further, in terms of Sample 3, Sample 16 and Sample 21, all the compositions were the same, and only the firing conditions were different. This result shows that even if the compositions of the dielectric ceramic compositions are the same, $r_{bmax}/r_a$, $r_{bmin}/r_a$, segregation particle existing rate and presence of Mg-including segregation particles can be determined by changing the firing conditions.

NUMERICAL REFERENCES

1 . . . multilayer ceramic capacitor
2 . . . dielectric layer
3 . . . internal electric layer
4 . . . external electrode
10 . . . capacitor element body
a . . . dielectric particle having core-shell structure
a1 . . . core part
a2 . . . shell part
b . . . segregation particle
c . . . other dielectric particle

The invention claimed is:

1. A dielectric ceramic composition, comprising:
a main component having perovskite type crystal structure shown by a general formula ABO₃, where A is at least one selected from the group consisting of Ba, Ca and Sr, and B is at least one selected from the group consisting of Ti and Zr; and
an additive including at least a rare earth compound, wherein
the dielectric ceramic composition includes at least dielectric particles having a core-shell structure and segregation particles,
a concentration of the rare earth compound in the segregation particle is twice or more than an average concentration of the rare earth compound in a shell part of the dielectric particle having the core-shell structure,
when a total area occupied by the dielectric particles having core-shell structures, the segregation particles and other dielectric particles is set as 100% at a cut surface, an area occupied by the segregation particles is 0.1 to 1.1%,
when a maximum particle size of the segregation particle is defined as $r_{bmax}$, a minimum particle size of the segregation particle is defined as $r_{bmin}$, and an average particle size of the dielectric particle having the core-shell structure is defined as $r_a$, a relation of $r_{bmax}/r_a \leq 2.00$ and $r_{bmin}/r_a \geq 0.25$ is satisfied,
the segregation particles substantially do not include Mg, and
0.6 to less than 1.2 moles of a compound including Si in terms of Si, as the additive, with respect to 100 moles of the main component.

2. The dielectric ceramic composition as set forth in claim 1, wherein the average particle size $r_a$ of the dielectric particle "a" is 0.16 to 0.26 µm.

3. The dielectric ceramic composition as set forth in claim 1, comprising:
0.6 to 1.4 moles of an oxide of Ra in terms of Ra₂O₃, where Ra is at least one selected from the group consisting of Dy, Gd and Tb;
0.2 to 0.7 mole of an oxide of Rb in terms of Rb₂O₃, where Rb is at least one selected from the group consisting of Ho and Y; and
0.2 to 0.7 mole of an oxide of Rc in terms of Rc₂O₃, where Rc is at least one selected from the group consisting of Yb and Lu,
as the rare earth compound, with respect to 100 moles of the main component.

4. The dielectric ceramic composition as set forth in claim 1, comprising:
0.6 to 1.6 moles of an oxide of Mg in terms of Mg, as the additive, with respect to 100 moles of the main component.

5. A ceramic electronic component having a dielectric layer composed of the dielectric ceramic composition as set forth in claim 1, and an electrode layer.

* * * * *